Aug. 8, 1933.   E. B. STONE   1,921,434
SPARE WHEEL LOCK
Filed May 4, 1928
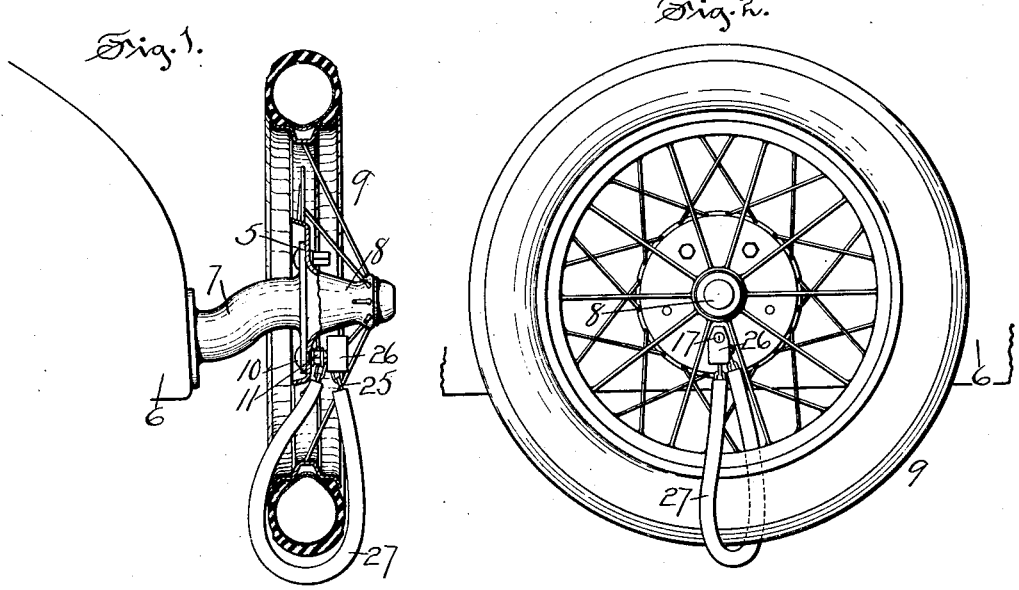
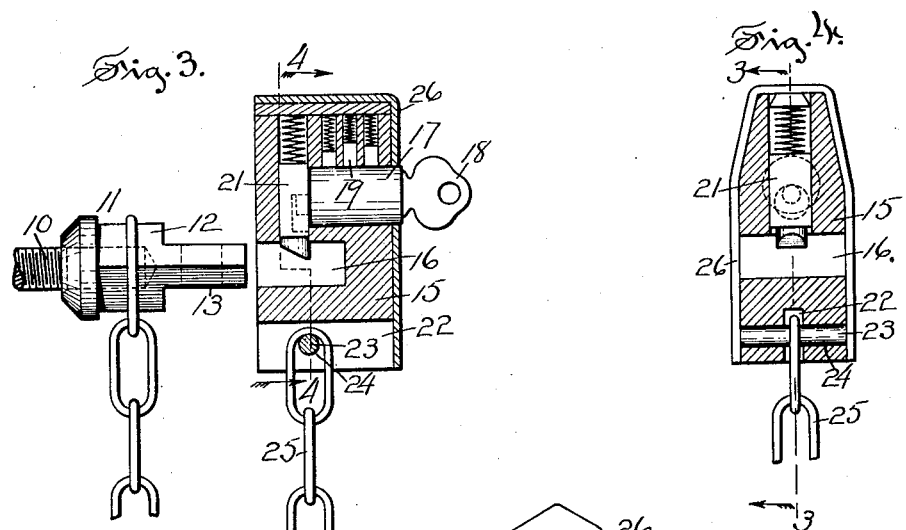
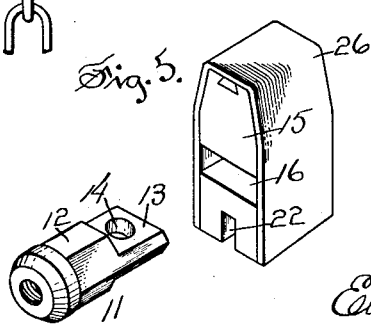
INVENTOR
Elmer B. Stone,
by Arthur C. Jenkins
ATTORNEY Patented Aug. 8, 1933

1,921,434

UNITED STATES PATENT OFFICE 1,921,434

SPARE WHEEL LOCK

Elmer B. Stone, New Britain, Conn., assignor to The American Hardware Corporation, New Britain, Conn., a Corporation of Connecticut Application May 4, 1928. Serial No. 275,023

1 Claim. (Cl. 70—90)

My invention relates to the class of devices more particularly used for securing spare wheels of vehicles against unauthorized removal from racks provided to receive them, and an object of my invention, among others, is the production of a lock that shall effectively perform the function just set out and that may be readily applied to structures in common use.

One form of lock embodying my invention and in the construction and use of which the objects herein set out, as well as others, may be attained, is illustrated in the accompanying drawing in which—

Figure 1 is a view in central crosswise section through a wheel and tire shown as attached to the wheel support of a vehicle and illustrating the application of my improved lock.

Figure 2 is a front view of a wheel support with a wheel secured thereto by my improved lock.

Figure 3 is a detail view, scale enlarged, in section through my improved lock illustrating its construction and adaptation.

Figure 4 is a view in section on a plane denoted by the dotted line 4—4 of Figure 3.

Figure 5 is an isometric view of the lock embodying my invention.

In the accompanying drawing the numeral 6 indicates the back portion of a motor vehicle and 7 an arm secured thereto and projecting therefrom and comprising a support for a vehicle wheel or rim, the outer end of this arm being suitably formed to receive the wheel or rim, in the structure herein shown the outer end of the arm having means to be received within the hub 8 of a wheel 9, whereby the wheel is supported. The means for securing the wheel in place embodies a plate 5 secured to the end of the arm 7 and having studs 10 that are threaded to receive nuts 11, said nuts each having an angular part 12 and a flattened end 13 with a hole 14 therein. All of the parts thus far described are of old and well known construction particularly in connection with the new Ford car that is just being put on the market, and this construction does not, therefore, except with other parts to be hereinafter described, constitute my present invention.

It is my purpose to provide means constructed to be attached to one of the nuts 11, the lower one as shown herein, forming part of the regular car equipment to prevent such nut from being removed from the stud 10, and at the same time to provide means for securing the tire so that it cannot be removed from the wheel. In accomplishing my purpose I make use of the flattened end portion of the nut and the hole 14 therein by making a lock comprising a case 15 having a recess 16 shaped to fit the flattened part 13 of the nut and within which recess said part is received.

The lock comprising the case 15 has a locking mechanism of ordinary form which includes a plug 17 having a slot to receive a key 18 and also having tumblers (not shown) cooperating with tumblers 19 in the lock case to effect locking of the plug against rotation and to release it for rotation, the latter when the key is inserted, in a manner that will be readily understood by those skilled in the art. The lock mechanism also embodies a bolt 21 engaged with the plug 17 to be actuated thereby, as for withdrawal from the hole 14, and a spring may be employed to force the bolt into said hole and as shown in Figure 3 of the drawing.

A groove 22 is formed in the bottom of the case and a pin 23 located in a hole 24 extends across said groove and through a hole in a flexible fastening member, in the structure herein shown said pin extending through a link in the end of a chain 25 whereby said chain is secured in said groove. The hole 24 extends inwardly from the outer surface of at least one side of the case, and as shown in Figure 4, and an armor in the form of a jacket 26 incloses the case and covers the end or ends of the pin 23. This armor may be hardened to resist cutting and thereby prevent access to the pin 23 as for removal of the latter.

The other end of the chain from that just referred to is engaged with the nut, as shown in Figure 3, after having been passed one or more times around the tire and rim, and as shown in Figure 1 of the drawing, and it will thus be seen that not only is the tire securely locked against unauthorized removal but the same means are utilized for locking the wheel or rim against theft and as one end of the chain is anchored to one end of the casing, the latter is prevented from rotating. The chain may have a cover 27, as a rubber tube, to prevent marring of the wheel rim or other parts.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

A lock for securing a spare wheel or rim to a support, said lock including a case having a recess within which a retaining nut is received, a flexible fastening member having one end adapted for attachment to the nut, key operated means for securing said lock case to said nut and for retaining the fastening member thereon, said case having a groove, a pin extending from the outer surface of the case across said groove to receive and secure the opposite end of said fastening member, and a jacket inclosing said case and overlying the end of said pin to prevent access thereto.

ELMER B. STONE.